(12) United States Patent
Dechet et al.

(10) Patent No.: US 11,945,919 B2
(45) Date of Patent: Apr. 2, 2024

(54) METHOD FOR PRODUCING A POPULATION OF PARTICLES OF POLYVINYLIDENE DIFLUORIDE OR OF PARTICLES OF A COPOLYMER COMPRISING POLYVINYLIDENE DIFLUORIDE

(71) Applicant: Evonik Operations GmbH, Essen (DE)

(72) Inventors: Maximilian Alexander Dechet, Zirndorf (DE); Stephanie Kloos, Huenenberg (CH); Jochen Schmidt, Schwarzenbach am Wald (DE); Wolfgang Peukert, Markt Schwaben (DE)

(73) Assignee: Evonik Operations GmbH, Essen (DE)

( * ) Notice: Subject to any disclaimer, the term of this patent is extended or adjusted under 35 U.S.C. 154(b) by 716 days.

(21) Appl. No.: 17/042,102

(22) PCT Filed: Mar. 26, 2019

(86) PCT No.: PCT/EP2019/057505
§ 371 (c)(1),
(2) Date: Sep. 26, 2020

(87) PCT Pub. No.: WO2019/185583
PCT Pub. Date: Oct. 3, 2019

(65) Prior Publication Data
US 2021/0115199 A1 Apr. 22, 2021

(30) Foreign Application Priority Data
Mar. 27, 2018 (EP) ...................... 18164395

(51) Int. Cl.
*C08J 3/14* (2006.01)
*B29B 9/10* (2006.01)
(Continued)

(52) U.S. Cl.
CPC .................. *C08J 3/14* (2013.01); *B29B 9/10* (2013.01); *B29C 64/153* (2017.08); *B33Y 70/00* (2014.12);
(Continued)

(58) Field of Classification Search
None
See application file for complete search history.

(56) References Cited

U.S. PATENT DOCUMENTS

| 4,078,916 | A | 3/1978 | Gerber et al. |
| 2002/0033785 | A1 | 3/2002 | Iwakura et al. |

(Continued)

FOREIGN PATENT DOCUMENTS

| DE | 26 26 358 A1 | 12/1976 |
| EP | 0 376 653 A2 | 7/1990 |

(Continued)

OTHER PUBLICATIONS

Product data sheet for cyclohexanone. Jun. 1999. Retrieved from noaa.gov on Jul. 20, 2023. (Year: 1999).*

(Continued)

*Primary Examiner* — Richard A Huhn
(74) *Attorney, Agent, or Firm* — Grüneberg and Myers PLLC

(57) ABSTRACT

The invention concerns a method for producing a population of particles of a polymer, wherein the polymer is polyvinylidene difluoride (=PVDF) or a copolymer comprising polyvinylidene difluoride, wherein the polymer is dissolved in an organic solvent, wherein molecules of the solvent (Continued)

Figure 1:
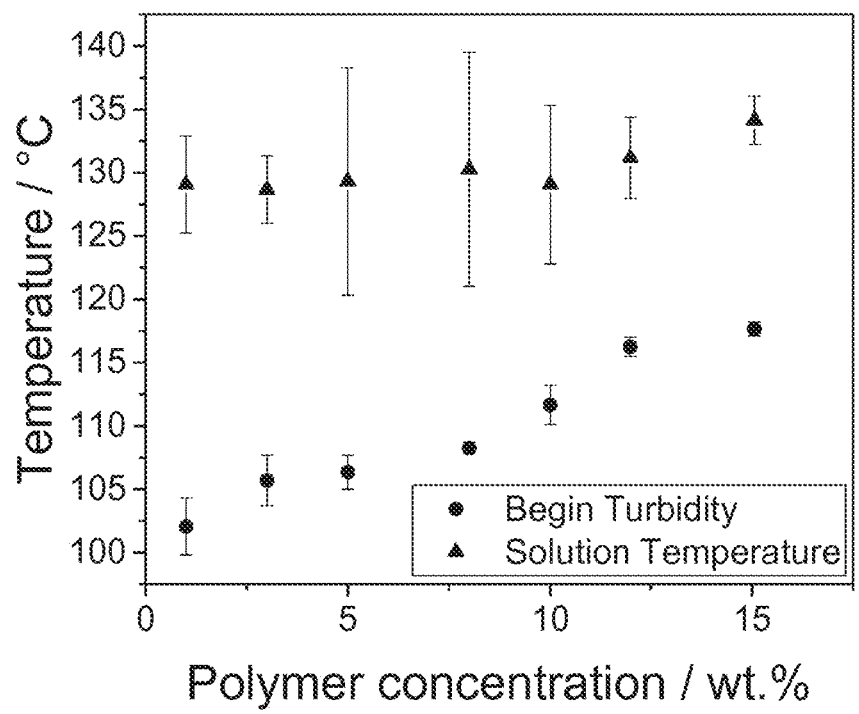

comprise or consist of 3 to 22 carbon atoms, one or more oxygen atom(s) as heteroatom(s) and at most one carbocyclic or heterocyclic residue comprising carbon atoms which carbocyclic or heterocyclic residue is an aromatic residue, wherein the carbon atoms in the carbocyclic or heterocyclic residue are carbon atoms taken from said 3 to 22 carbon atoms, wherein the one or more oxygen atom(s) is/are part of at least one carboxylic acid ester group or carbonyl group, wherein the carbon atom in the carboxylic acid ester group and the carbonyl group is one of said 3 to 22 carbon atoms or/and at least one ether group and at most three hydroxyl groups, wherein in case of presence of at least one hydroxyl group the number of ether groups always exceeds the number of hydroxyl groups, wherein in case of presence of only 3 carbon atoms the molecule comprises additionally at least one pseudohalogen or additionally at least one further heteroatom selected from halogen, N, B, P and S, wherein the method comprises heating the solvent and the solid polymer immersed in the solvent at least until the polymer completely dissolves, cooling the solution until polymer particles are formed, and separating the particles formed during step b) from the solution or from a gel formed from the solution during step b).

19 Claims, 11 Drawing Sheets

(51) Int. Cl.
| | | |
|---|---|---|
| *B29C 64/153* | (2017.01) | |
| *B33Y 70/00* | (2020.01) | |
| *C08L 27/16* | (2006.01) | |
| *B29K 27/00* | (2006.01) | |
| *B33Y 10/00* | (2015.01) | |

(52) U.S. Cl.
CPC ........... *B29K 2027/16* (2013.01); *B33Y 10/00* (2014.12); *C08J 2327/16* (2013.01); *C08L 27/16* (2013.01)

(56) References Cited

U.S. PATENT DOCUMENTS

| | | | |
|---|---|---|---|
| 2005/0010027 A1* | 1/2005 | Vandenhende | .......... C08J 11/08 528/502 E |
| 2015/0218359 A1* | 8/2015 | Echigo | .................... C08L 71/02 524/378 |

FOREIGN PATENT DOCUMENTS

| | | |
|---|---|---|
| EP | 0 742 251 A1 | 11/1996 |
| EP | 0 850 982 A2 | 1/1998 |
| JP | H 03-128940 A | 5/1991 |
| JP | 2002-097281 | 4/2002 |
| WO | 2007/133912 A2 | 11/2007 |
| WO | WO-2007133912 A2 * | 11/2007 ........... B29C 64/153 |
| WO | 2014/034581 | 3/2014 |

OTHER PUBLICATIONS

Hansen Solubility Parameters: A User's Handbook. Second Edition. Chapter 18. Hansen, C. M. CRC Press 2007. (Year: 2007).*

Technical Data sheet for diethylene glycol dimethyl ether. Clariant. Sep. 2006. (Year: 2006).*

Abstract, Database WPI, Week 199128, AN 1991-204224 (May 31, 1991).

Nichols et al., "Preparation of Small Poly(butylene Terephthalate) Spheres by Crystallization from Solution," Journal of Polymer Science: Part B: Polymer Physics, vol. 32, pp. 573-577 (1994).

International Search Report, International Application No. PCT/EP2019/057505 (published under WO 2019/185583), 3 pages (dated Apr. 29, 2019).

Written Opinion, International Application No. PCT/EP2019/057505 (published under WO 2019/185583), 5 pages (dated Apr. 29, 2019).

* cited by examiner

| Solvent | CAS | Elemental Formula | $\delta_D$ | $\delta_P$ | $\delta_H$ | $\delta_T$ | Structural Formula | Electron Microscopical Picture |
|---|---|---|---|---|---|---|---|---|
| Acetophenone | 98-86-2 | $C_8H_8O$ | 18.8 | 9 | 4 | 21.22 | | |
| Benzaldehyde | 100-52-7 | $C_7H_6O$ | 19.4 | 7.4 | 5.3 | 21.43 | | |

Fig. 5

| | | | | | | | |
|---|---|---|---|---|---|---|---|
| Diethylene glycol monoethyl ether | 111-90-0 | $C_6H_{14}O_3$ | 16.1 | 9.2 | 12.2 | 22.20 | |
| Dimethyl phthalate | 131-11-3 | $C_{10}H_{10}O_4$ | 18.6 | 10.8 | 4.9 | 22.06 | |
| Isoamyl acetate | 123-92-2 | $C_7H_{14}O_2$ | 15.3 | 3.1 | 7 | 17.11 | |

Fig. 5 (continuation)

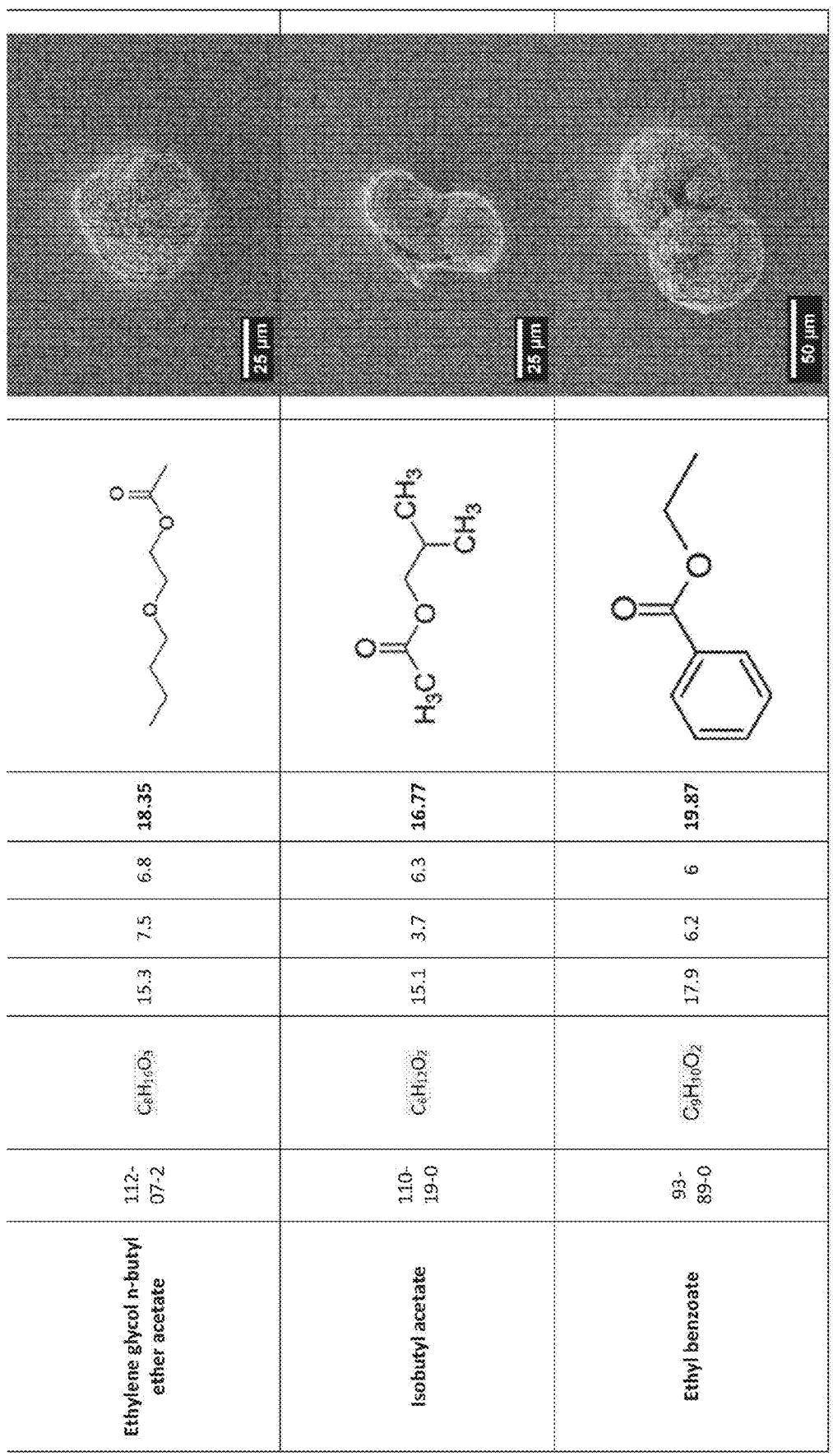
Fig. 5 (continuation)

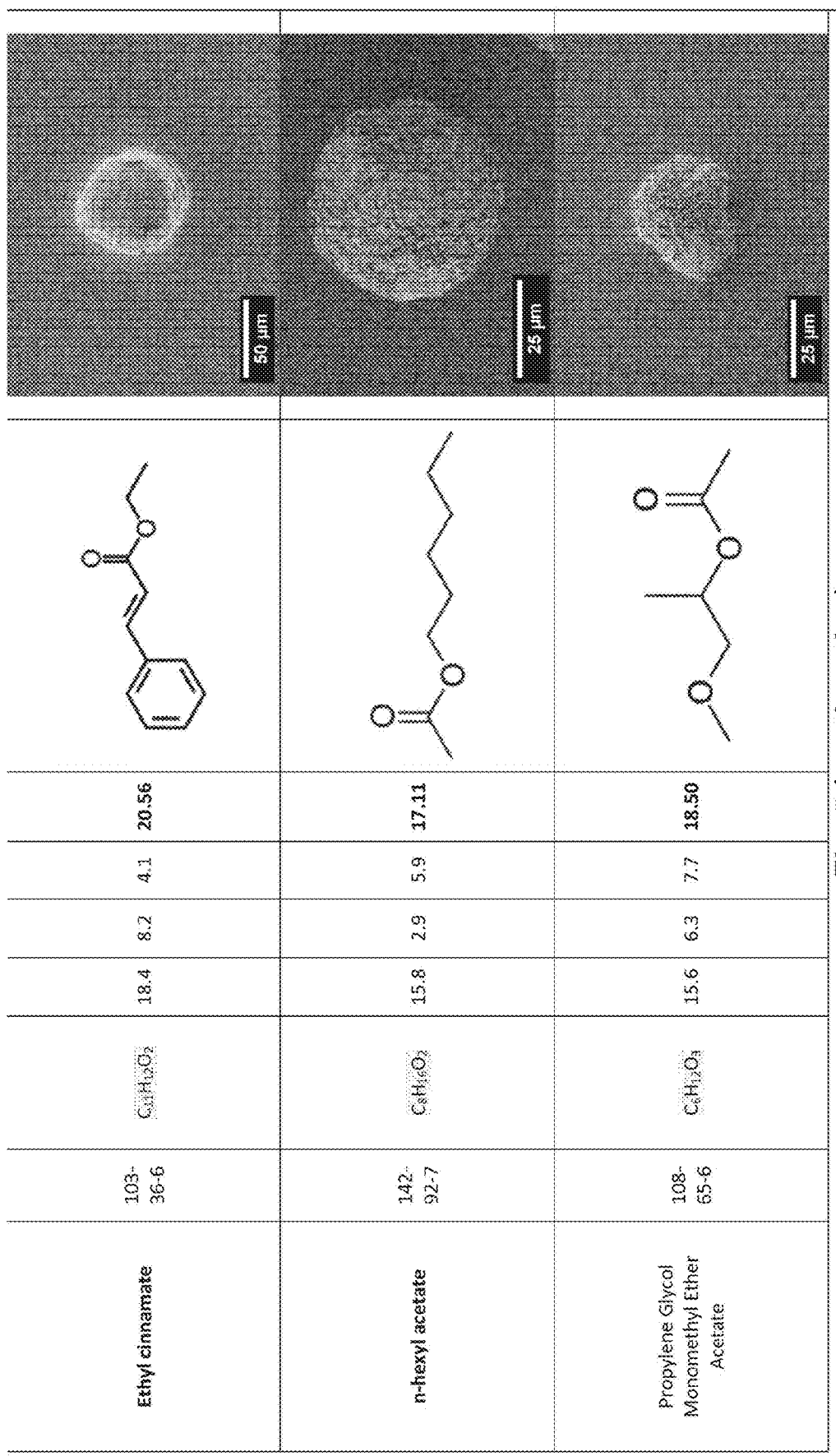
Fig. 5 (continuation)

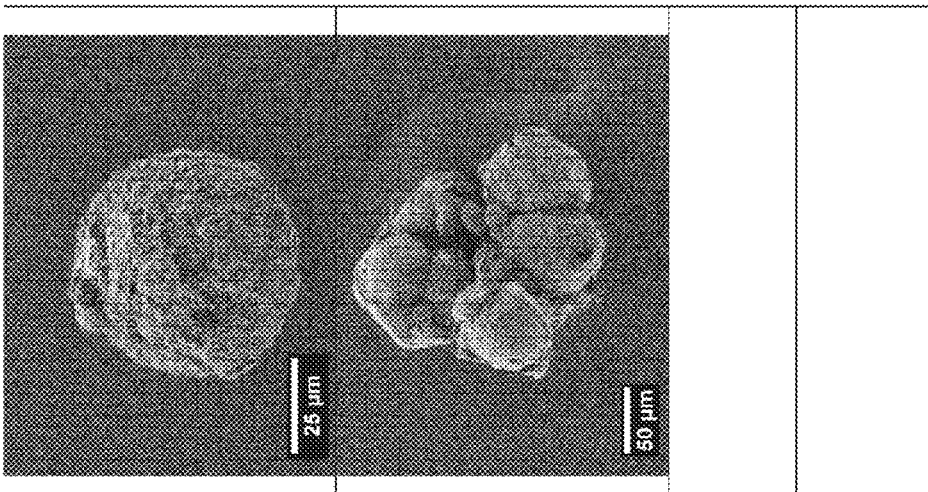
Fig. 5 (continuation)

| Methyl glycol (aka. Ethylene glycol monomethyl ether) | 109-86-4 | C₃H₈O₂ | 16 | 8.2 | 15 | 23.41 |  |

Fig. 5 (continuation)

| Solvent | CAS | Elemental Formula | Struktural Formula | $\delta_D$ | $\delta_P$ | $\delta_H$ | $\delta_T$ |
|---|---|---|---|---|---|---|---|
| Benzyl benzoate | 120-51-4 | C₁₄H₁₂O₂ | | 20 | 5.1 | 5.2 | 21.28 |
| Cyclopentanone | 120-92-3 | C₅H₈O | | 17.9 | 11.9 | 5.2 | 22.11 |
| Benzyl alcohol | 100-51-6 | C₇H₈O | | 18.4 | 6.3 | 13.7 | 23.79 |

| | | | | | | |
|---|---|---|---|---|---|---|
| Diphenyl ether | 101-84-8 | $C_{12}H_{10}O$ | | 19.4 | 3.4 | 4 | 20.10 |
| Ethylene glycol monophenyl ether | 122-99-6 | $C_8H_{10}O_2$ | | 17.8 | 5.7 | 14.3 | 23.53 |
| Di(propylene glycol) dibenzoate | 27138-31-4 | $C_{20}H_{22}O_5$ | | , | , | , | , |
| Cyclohexanone | 108-94-1 | $C_6H_{10}O$ | | 17.8 | 8.4 | 5.1 | 20.33 |
| Dimethyl Sulfoxide (DMSO) | 67-68-5 | $C_2H_6OS$ | | 18.4 | 16.4 | 10.2 | 26.68 |
| Dimethyl sulfone | 67-71-0 | $C_2H_6O_2S$ | | 19 | 19.4 | 12.3 | 29.81 |

Figure 6:

Fig. 6 (continuation)

| | | | | | | |
|---|---|---|---|---|---|---|
| 1-hexanol | 111-27-3 | C₆H₁₄O | (structure) | 15.9 | 5.8 | 12.5 | 21.04 |
| Isoamyl alcohol | 123-51-3 | C₅H₁₂O | (structure) | 15.8 | 5.2 | 13.3 | 21.30 |
| 1-pentanol | 71-41-0 | C₅H₁₂O | (structure) | 15.9 | 5.9 | 13.9 | 21.93 |
| Ethanol | 64-17-5 | C₂H₅OH | (structure) | 15.8 | 8.8 | 19.4 | 26.52 |
| Acetone | 67-64-1 | C₃H₆O | (structure) | 15.5 | 10.4 | 7 | 19.94 |
| Triethylene glycol | 112-27-6 | C₆H₁₄O₄ | (structure) | 16 | 12.5 | 18.6 | 27.54 |

Fig. 6 (continuation)

METHOD FOR PRODUCING A POPULATION OF PARTICLES OF POLYVINYLIDENE DIFLUORIDE OR OF PARTICLES OF A COPOLYMER COMPRISING POLYVINYLIDENE DIFLUORIDE

CROSS-REFERENCE TO RELATED APPLICATIONS

This application is a 371 National Phase of International Patent Application No. PCT/EP2019/057505 filed on Mar. 26, 2019, which claims priority to European Patent Application No. EP 18164395.8 filed on Mar. 27, 2018, the content of each of which applications is incorporated herein by reference.

The invention concerns a method for producing a population of particles of a polymer, wherein the polymer is polyvinylidene difluoride (=PVDF) or a copolymer comprising polyvinylidene difluoride, in which population at least 96% of the particles may have a particle size in the range of 5 µm to 200 µm.

DE 26 26 358 A1 discloses a method for recovery of polyester contained in polyester containing material without degradation or deterioration of the polyester. The method involves dissolving the polyester in a polar solvent at an elevated temperature under conditions chosen so that the polyester content of the material is not decreased. The resulting hot solution is cooled to a temperature at which the polyester contained in the solution begins to crystalize. The cooling rate is regulated for controlling the size of the precipitating particles of polyester.

EP 0 742 251 A1 discloses a process for recycling mixed polymer containing PET from a mixed polymer recycle stream. The process comprises contacting the mixed polymer recycle stream with a solvent which selectively dissolves the polyester, separating the selective solvent containing PET from the residual mixed polymer, cooling the selective solvent to precipitate the polyester and separating the polyester thereby recovered.

EP 0 850 982 A2 discloses a process for recovering polyester polymer as a microporous solid from a mixed polymer recycle stream. The method comprises contacting the mixed polymer recycle stream at elevated temperature with a selective solvent in which polyester polymers are soluble and other polymers present in the recycle stream are substantially insoluble to form a solution of polyester polymer in the selective solvent. If the concentration of polyester in said solution is below 35 wt. % it is increased to above that value. The selective solvent solution is cooled to form a solid material having an interconnected phase of solid polymer domains rich in polyester polymer and a phase of solvent domains rich in selective solvent. The selective solvent is extracted from the solid material to form a microporous solid.

EP 0 376 653 A2 discloses a non-attritive method for making fine particles of crystallizable polyester, polycarbonate or polyamide polymers or blends thereof which comprises heating a mixture of the polymer in a moderate solvent for the polymer to a temperature above the melting point of the polymer when in the moderate solvent and then cooling whereupon the particles re-crystalize from the mixture.

From Nichols, M. E. and Robertson, R. E, Journal of Polymer Science: Part B: Polymer Physics, Vol. 32, 573-577 (1994) a preparation of small poly(butylene terephthalate) spheres by crystallization from a solution in a diglycidyl ether of bisphenol-A epoxy is known. PBT was dissolved in this epoxy at 230° C. Solutions of PBT were then cooled to a specific temperature and held for various times, typically 155° C. for 20 min, during which time the PBT precipitated from solution. The PBT particles were then separated from the liquid epoxy resin by repeated washing with acetone. The particles were dried in an oven at 50° C. for 4 h to remove any residual solvent. The dried particles had a diameter of approximately 23 µm.

From JP H03128940 A it is known to produce finely powdered polyvinylidene difluoride resin by thermally dissolving the polyvinylidene difluoride resin in methyl glycol in a pressure vessel and cooling the resulting solution under stirring to about 70° C. to precipitate a powder with a particle diameter of 50 µm or lower. By varying the weight ratio of the resin to the solvent, variable between (1:8)-(1: 12), the particle diameter distribution is varied within a range of 30 µm.

WO 2007/133912 A2 discloses the use of a powder of a fluoropolymer, in particular polyvinylidene fluoride and its copolymers, or polychlorotrifluoroethylene and its copolymers, in a laser sintering process. According to this document Fluoropolymer powders can be directly formed into powders from emulsion or suspension polymerization through the use of spray drying, freeze-drying, and other methods of powder formation. The powder average particle size is less than 100 microns, typically in the range of 40 microns to 80 microns. Particle size can be adjusted and optimized for the laser sintering process by known means, such as by cryogenic grinding and by sieving and/or classifying.

The problem to be solved by the present invention is to provide an alternative method for producing particles of PVDF or particles of a copolymer comprising PVDV, to provide the particles produced by that method and a use of the particles produced according to that method. The particles shall be relatively spherical and/or shall have a relatively narrow range of particle sizes, in particular without application of a selection process.

The problem is solved by subject-matter of claims 1, 17 and 18 of the present invention. Embodiments of the invention are subject-matter of claims 2 to 16.

According to the invention a method for producing a population of particles of a polymer is provided, wherein the polymer is polyvinylidene difluoride (=PVDF) or a copolymer comprising polyvinylidene difluoride. The polymer is dissolved in an organic solvent. The molecules of the solvent comprise or consist of 3 to 22 carbon atoms, one or more oxygen atom(s) as heteroatom(s) and at most one, i. e. null or one, carbocyclic or heterocyclic residue comprising carbon atoms which carbocyclic or heterocyclic residue is an aromatic residue. The carbon atoms in the carbocyclic or heterocyclic residue are carbon atoms taken from said 3 to 22 carbon atoms. The one or more oxygen atom(s) is/are part of at least one carboxylic acid ester group or carbonyl group, wherein the carbon atom in the carboxylic acid ester group and the carbonyl group is one of said 3 to 22 carbon atoms or/and at least one ether group and at most three, i. e. null, one, two or three, hydroxyl groups, wherein in case of presence of at least one hydroxyl group the number of ether groups always exceeds the number of hydroxyl groups.

The carbonyl group may be present in an aldehyde group. In case of presence of only 3 carbon atoms the molecule comprises additionally at least one pseudohalogen or additionally at least one further heteroatom selected from halogen, N, B, P and S. If the further heteroatom is an S-atom, it is optionally not part of a sulfone residue. The pseudohalogen may be selected from —CN, —N$_3$, —OCN, —NCO, —CNO, —SCN, —NCS, —SeCN. The term "molecules of the solvent" usually means all molecules of the solvent or the predominant part of the molecules of the solvent, e. g., when the solvent is not or at least not completely free of water. The feature that the carbocyclic or heterocyclic residue is an aromatic residue particularly excludes lactams, lactones and non-aromatic cyclic ketones, such as cyclopentanone and cyclohexanone, which are not able to dissolve PVDF or do not result in spherical particles.

The molecules of the solvent consisting of 10 to 22 carbon atoms, one or more oxygen atom(s) as heteroatom(s) and at most one, i. e. null or one, carbocyclic or heterocyclic residue comprising carbon atoms which carbocyclic or heterocyclic residue is an aromatic residue may consist of only one kind of molecules or different kind of molecules. If it consists of different kind of molecules the solvent is a mixture of solvents. The solvent as defined above completely solubilizes the polymer only at a temperature of the solvent above 25° C., in particular above 50° C., in particular above 75° C., in particular above 100° C. This means that the solvent does not or at least not completely solubilize the polymer at a temperature of 25° C. or below, in particular at a temperature of 50° C. or below, in particular at a temperature of 75° C. or below, in particular at a temperature of 100° C. or below.

The method according to the invention comprises the following steps:
a) heating the solvent and the solid polymer immersed in the solvent at least until the polymer completely dissolves, i. e. heating the solvent and the solid polymer immersed in the solvent at least to a first temperature, at which first temperature the polymer completely dissolves, wherein the first temperature is indicated by a resulting solution showing no turbidity,
b) cooling the solution resulting from step a) until polymer particles are formed, i. e. cooling the solution to a second temperature or temperature range, wherein the second temperature is a temperature at which polymer particles are formed upon cooling and wherein the temperature range is a temperature range at which polymer particles are formed upon cooling, and
c) separating the particles formed during step b) from the solution or from a gel formed from the solution during step b).

The first temperature is determined by heating the solvent and the solid polymer immersed in the solvent until a resulting solution shows no turbidity and measuring the temperature at which turbidity completely disappears. Turbidity may be measured by measuring light scattering. A mixing of the solvent and/or the solution during steps a) and b) may occur, in particular independently for each of steps a) and b), either passively by convection or actively by agitating the solvent and/or the solution, e. g. by stirring. In an embodiment the solution is agitated during step b) such that a laminar flow forms in the predominant part, in particular in more than 60%, in particular in more than 70%, in particular in more than 80%, in particular in more than 85%, of the solution which laminar flow is maintained at least during the predominant time of performance of step b), in particular during more than 60%, in particular during more than 70%, in particular during more than 80%, in particular during more than 85%, in particular during 100%, of the time of performance of step b). Since small turbulent flows always occur at surfaces contacting a laminarly flowing liquid a laminar flow in 100% of the solution is impossible. The laminar flow in the predominant part of the solution results in formation of very uniform and spherical particles.

At the second temperature or temperature range polymer particles are formed. The second temperature is the temperature at which the polymer particles form or start to form upon cooling and the temperature range is the range within the temperature at which the polymer particles start to form upon cooling and the temperature at which no further particles are formed upon cooling. The cooling at step b) may be practiced until polymer particles are formed at the second temperature or in the temperature range. However, it may also be that the polymer particles do not form spontaneously when the second temperature is reached but only when the solution is maintained for a while at this second temperature. Formation of particles may be observed by measuring viscosity of the solution, in particular by measuring power input of a stirrer stirring the solution, or optically, in particular by measuring of light scattering in the solution, or other physical methods known in the art.

In the population of particles at least 96%, in particular at least 97%, in particular at least 98%, in particular at least 99%, in particular 100%, of the particles may have a particle size in the range of 5 μm to 200 μm. The particle size is understood to be the volume equivalent spherical diameter (=VESD). This particle size can be determined by static light scattering, laser diffraction, microscopy, in particular optical microscopy, followed by image analysis, sedimentation analysis and by use of a disc centrifuge.

The copolymer may be a copolymer comprising more than 50 wt. %, in particular more than 60 wt. %, in particular more than 70 wt. %, in particular more than 80 wt. %, in particular more than 90 wt. %, in particular more than 95 wt. %, of PVDF.

PVDF is a thermoplastic fluoropolymer produced by the polymerization of vinylidene difluoride. For performing the method according to the invention the polymer to be dissolved in step a) may be present in the form of pieces of the polymer, e. g. obtained as a commercially available granulate or powder or by sawing pieces from a PVDF bar or another semi-manufactured PVDF product. The cooling of the solution may be performed actively, e. g. by use of a heat exchanger, or by letting the solution cool down by normal temperature exchange with the surrounding.

The molecules of the solvent may comprise at least one additional heteroatom selected from halogen, O, N, B, P and S or comprises at least one pseudohalogen or—in case a pseudohalogen is already present in the molecule—at least one further pseudohalogen. The pseudohalogen or further pseudohalogen may be selected from —CN, —N$_3$, —OCN, —NCO, —CNO, —SCN, —NCS, —SeCN. If the additional heteroatom is an S-atom, it is optionally not part of a sulfone residue. In an embodiment the molecules of the solvent comprise at most 4, 3 or 2 additional heteroatoms.

In an embodiment the further heteroatom and the additional heteroatom are selected from N, B, P and S, i. e. neither the further heteroatom nor the additional heteroatom is halogen. In many cases solvents comprising halogen are toxic. Handling these solvents is difficult, their use is problematical because of the environmental burden involved in the use and resulting particles may contain residues of the toxic solvents.

A suitable solvent in which the polymer can be dissolved in step a) is diethylene glycol monobutyl ether acetate, acetyltributylcitrate, acetophenone, benzaldehyde, diethylene glycol monoethyl ether, dimethyl phthalate, isoamyl acetate, ethylene glycol n-butyl ether acetate, isobutyl acetate, ethyl benzoate, ethyl cinnamate, n-hexyl acetate, propylene glycol monomethyl ether acetate, pentyl acetate, triacetin, n-butyl acetate, or propyl acetate, in particular diethylene glycol monobutyl ether acetate or acetyltributylcitrate, in particular diethylene glycol monobutyl ether acetate.

The boiling temperature of methyl glycol known as solvent from JP H03128940 A is 124° C. Since PVDF dissolves above this temperature—presumably at a temperature in the range of 125 to 135° C. —, it is required to use a pressure vessel to dissolve it in this solvent. In contrast to the method known from JP H03128940 A this is not required in the method according to the invention, if the solvent used in this method is a solvent that boils at a higher temperature than methylglycol such as diethylene glycol monobutyl ether acetate, ethylene glycol n-butyl ether acetate, acetophenone, diethylene glycol monoethyl ether, ethyl cinnamate benzaldehyde, dimethyl phthalate, ethyl benzoate, n-hexyl acetate, pentyl acetate, triacetin, isoamyl acetate, acetyltributylcitrate or propylene glycol monomethyl ether acetate. These solvents are able to dissolve PVDF without boiling.

Furthermore, according to European Union regulation called Registration, Evaluation, Authorisation and Restriction of Chemicals (REACH) all of the above-listed solvents are less problematic and dangerous than methyl glycol that is characterized as being able to damage fertility, to damage the unborn child and to cause damage to organs through prolonged or repeated exposure as well as being flammable and harmful if swallowed, in contact with skin or if inhaled. Besides safety problems resulting from working with methyl glycol, the residual solvent in the particles obtained from a methyl glycol solution burdens the particles with the problematic and dangerous features mentioned above.

A particular advantage of the method according to the invention performed with isobutyl acetate or propyl acetate as solvent is that the resulting particles contain much less solvent than particles precipitated from methyl glycol. Therefore, they are shrinking much less when used for selective laser sintering (=SLS or LS) or selective laser melting (=SLM), a powder bed fusion processes or laser beam melting (=LBM) of a polymer. Owing to this feature, products can be produced with higher precision with particles precipitated from isobutyl acetate or propyl acetate as solvent in the method of the invention than with particles precipitated from methyl glycol.

An advantage of the method according to the invention is that the population of particles generated by this method has a relatively narrow range of particle sizes, i. e. the method results in a very narrow particle size distribution immediately resulting from the method. For many applications an additional selection of particles having a specific size, e. g. by sieving is not required. Furthermore, the particles resulting from the method are relatively spherical. In contrast to irregularly shaped particles produced by grinding this results in a high packing density and bulk density as well as a good flowability of the particles. Owing to these features, the population of particles produced by the method is ideal for use in additive manufacturing, such as selective laser sintering (=SLS), selective laser melting (=SLM), a powder bed fusion processes or laser beam melting of a polymer. Owing to the uniformity of the particles and their good flowability, fine structures can be produced having a wall thickness as thin as the maximal diameter of the particles. Furthermore, the above features make the particles very suitable as an additive in the production of lacquer. In particular the relative spherical form and the good flowability prevent agglomeration of the suspended particles in the lacquer during storage of the lacquer. In contrast to this, irregularly shaped particles tend to agglomerate.

The weight of the polymer in relation to the total weight of the solvent and the polymer may be in the range of 0.01 wt. % to 50 wt. %, in particular in the range of 0.1 wt. % to 45 wt. %, in particular in the range of 0.2 wt. % to 40 wt. %, in particular in the range of 0.25 wt. % to 35 wt. %, in particular in the range of 0.5 wt. % to 30 wt. %, in particular 0.75 wt. % to 25 wt. %, in particular 1 wt. % to 15 wt. %. The abbreviation "wt. %" means "percent by weight". By choosing an appropriate polymer concentration a more spherical form of the particles and/or a narrower particle size distribution can be realized.

Cooling may be performed until clouding of the solution starts, i. e. until a third temperature is reached at which third temperature clouding of the solution starts. "Clouding" means the formation of turbidity. Cooling can then be continued at least until turbidity does not further increase, i. e. until a fourth temperature is reached at which fourth temperature turbidity does not further increase. Consequently, the third temperature is the temperature at which clouding of the solution starts upon cooling and the fourth temperature is the temperature at which turbidity does not further increase upon cooling. Turbidity or light scattering of the solvent or solution may be measured and the first, second, third and fourth temperature, respectively as well as the temperature range may be determined during the procedure in which the particles are produced or in a procedure separate from the procedure in which the particles are produced. Each of the first, second, third and fourth temperature can be determined independently from the other temperatures.

The separate procedure may be performed only once such that the respective first, second, third and/or fourth temperature is/are known when performing the method according to the invention. The separate procedure can be an experiment, in which the polymer is dissolved in an equal solvent at an equal concentration as in the method to be performed according to the invention. This separate procedure may also be a method according to the invention performed previously in which method the respective temperature has been determined.

The starting of clouding at the third temperature indicates a fluid-fluid phase separation. During this phase separation the former homogeneous polymer solution separates in two phases. At the third temperature droplets of a polymer rich phase form in a matrix of a polymer poor outer phase. The concentration of the polymer in the droplets is higher than the total polymer concentration when starting the cooling process. The inventors assume that the reason for the generation of relatively uniform and spherical particles is that stopping cooling or cooling down only slowly after the third temperature is reached, allows the very small droplets formed when the clouding of the solution starts at the third temperature to form bigger droplets by diffusion of residual polymer from the matrix into the droplets, as well as by Ostwald ripening and by coalescence. The inventors further assume that growth of most of the droplets is stopped by the begin of crystallization of the polymer in the droplets. Crystallization of the polymer inside the droplets can start at isothermal holding at the third temperature or upon further cooling. A homogenous temperature profile in the solution results in a crystallization that starts in all droplets relatively simultaneously. This leads to particles which are relatively uniform in size and relatively spherical. A homogenous temperature profile is supported by slow cooling after the third temperature is reached or by keeping the solution at the third temperature or at a temperature up to 3° C. below the third temperature for at least 5 min. From this it is clear that the second and the third temperature can be identical.

After onset of clouding, i. e. after reaching of the third temperature cooling can be continued at a rate in a range of 0.05° C./min to 5° C./min, in particular 0.1° C./min to 2° C./min, in particular 0.4° C./min to 1.6° C./min, in particular 0.6° C./min to 1.5° C./min, or cooling of the solution can be stopped at the onset of clouding or cooling of the solution can be continued for up to 3° C. after the onset of clouding and then stopped, i. e. the solution can be kept at the third temperature or at a temperature up to 3° C. below the third temperature. Stopping of cooling or keeping at the third temperature or the temperature below the third temperature can be maintained for at least 5 min, in particular at least 10 min, in particular at least 20 min, in particular at least 30 min, and then the solution can be cooled at a rate in a range of 0.05° C./min to 5° C./min, in particular 0.1° C./min to 2° C./min, in particular 0.4° C./min to 1.6° C./min, in particular 0.6° C./min to 1.5° C./min. In this case it may be required to heat the solution during step b) to prevent a cooling rate exceeding the range of 0.05° C./min to 5° C./min, in particular 0.1° C./min to 2° C./min, in particular 0.4° C./min to 1.6° C./min, in particular 0.6° C./min to 1.5° C./min, or for keeping the solution at the third temperature for at least 5 min, in particular at least 10 min, in particular at least 20 min, in particular at least 30 min.

In an embodiment of the invention cooling is stopped or the solution is kept at the third temperature for a time in the range of 5 min to 150 min, in particular 10 min to 130 min, in particular 20 min to 115 min, in particular 30 min to 100 min, in particular 40 min to 90 min, in particular 50 min to 75 min, in particular 55 min to 70 min. Prolonging the time at which cooling is stopped or the solution is kept at the third temperature may increase uniformity and/or size of the particles.

Sphericity, uniformity and/or narrow range of particle sizes can be increased when cooling in step b) is interrupted for at least 5 min, in particular at least 10 min, in particular at least 15 min, at a temperature 12° C. to 0.01° C., in particular 11.5° C. to 1° C., in particular 11° C. to 2° C., in particular 10° C. to 3° C., in particular 8° C. to 4° C., above a temperature at which clouding starts which temperature is determined before in a separate procedure. This means that cooling in step b) is interrupted at a fifth temperature, wherein the fifth temperature is any temperature in the range of 12° C. to 0.01° C., in particular 11.5° C. to 1° C., in particular 11° C. to 2° C., in particular 10° C. to 3° C., in particular 8° C. to 4° C., above the third temperature and wherein the solution is kept at said fifth temperature for at least 5 min, in particular at least 10 min, in particular at least 15 min, wherein the third temperature is determined before in a separate procedure. The separate procedure can be an experiment, in which the polymer is dissolved in an equal solvent at an equal concentration as in the procedure at which the cooling shall be interrupted at the fifth temperature. In this separate procedure turbidity is measured during continuously cooling down, e. g. at a rate of 1 to 5° C. per min, and the third temperature is determined as the temperature at which clouding starts. The separate procedure may also be a method according to the invention performed previously.

The reason for the effect of the interruption of cooling down or cooling only to the fifth temperature may be that very small polymer rich droplets could be formed before clouding of the solution can be observed or even measured. In these very small droplets nucleation may start. Nuclei formed during this process may serve as starting structure for heterogeneous nucleation forming the particles, in particular at the third temperature and below the third temperature but also at the fifth temperature. When particles form at the fifth temperature, the second and the fifth temperature are identical.

Interruption of cooling may be maintained, i. e. the solution may be kept at the fifth temperature, for a time in the range of 5 min to 150 min, in particular 10 min to 120 min, in particular 15 min to 60 min, in particular 15 min to 35 min, in particular 20 min to 30 min.

With respect to a selection of a suitable organic solvent, the total Hansen solubility parameter can be used. The total Hansen solubility parameter $\delta_T$ can be calculated according to the formula $\delta_T^2 = \delta_D^2 + \delta_P^2 + \delta_H^2$ or by use of a HSPiP Software available from Dr. techn. Charles M. Hansen, Jens Bornøsvej 16, 2970 Hørsholm, Denmark or via www.hansen-solubility.com, wherein $\delta_D$, $\delta_P$ and $\delta_H$ are determined empirically according to a method developed by Dr. techn. Charles M. Hansen and explained at www.hansen-solubility.com. Examples of total Hansen solubility parameters $\delta_T$ are given in the following table:

| Polymer/Solvent | $\delta_D$ [MPa$^{1/2}$] | $\delta_P$ [MPa$^{1/2}$] | $\delta_H$ [MPa$^{1/2}$] | $\delta_T$ [MPa$^{1/2}$] | $\delta_{Hildebrand}$ [MPa$^{1/2}$] |
|---|---|---|---|---|---|
| PVDF | 17 | 10.6 | 10.2 | 23.23 | 23.2 [1] |
| PVDF [1] | 13.7 | 4.1 | 8.2 | 19.2 | 23.2 [1] |
| Acetophenone | 18.8 | 9 | 4 | 21.22 | 21.7 |
| Benzaldehyde | 19.4 | 7.4 | 5.3 | 21.43 | 19.2 |
| n-butyl acetate | 15.8 | 3.7 | 6.3 | 17.41 | 17.4 |
| Diethylene glycol monoethyl ether | 16.1 | 9.2 | 12.2 | 22.20 | N/A |
| Diethylene glycol n-butyl ether acetate | 16 | 4.1 | 8.2 | 18.44 | 17.4 |
| Dimethyl phthalate | 18.6 | 10.8 | 4.9 | 22.06 | 21.9 |
| Ethyl benzoate | 17.9 | 6.2 | 6 | 19.87 | 16.8 |
| Ethyl cinnamate | 18.4 | 8.2 | 4.1 | 20.56 | N/A |
| Ethylene glycol n-butyl ether acetate | 15.3 | 7.5 | 6.8 | 18.35 | N/A |
| n-hexyl acetate | 15.8 | 2.9 | 5.9 | 17.11 | N/A |
| Isoamyl acetate | 15.3 | 3.1 | 7 | 17.11 | N/A |
| Isobutyl acetate | 15.1 | 3.7 | 6.3 | 16.77 | 17.0 |

-continued

| Polymer/Solvent | $\delta_D$ [MPa$^{1/2}$] | $\delta_P$ [MPa$^{1/2}$] | $\delta_H$ [MPa$^{1/2}$] | $\delta_T$ [MPa$^{1/2}$] | $\delta_{Hildebrand}$ [MPa$^{1/2}$] |
|---|---|---|---|---|---|
| Pentyl acetate | 15.8 | 3.3 | 6.1 | 17.26 | N/A |
| Propyl acetate | 15.3 | 4.3 | 7.6 | 17.62 | 18.0 |
| Propylene glycol monomethyl ether acetate | 15.6 | 6.3 | 7.7 | 18.50 | N/A |
| Triacetin | 16.5 | 4.5 | 9.1 | 19.37 | N/A |

[1] DOI: 10.1002/polb.1988.090260405 or: http://onlinelibrary.wiley.com/doi/10.1002/polb.1988.090260405/epdf
$\delta_D$ [MPa$^{1/2}$] = energy from dispersion forces between molecules
$\delta_P$ [MPa$^{1/2}$] = energy from dipolar intermolecular forces between molecules
$\delta_H$ [MPa$^{1/2}$] = energy from hydrogen bonds between molecules
$\delta_T$ [MPa$^{1/2}$] = total Hansen solubility parameter
$\delta_{Hildebrand}$ [MPa$^{1/2}$] = Hildebrand solubility parameter Hildebrand solubility parameters are available from Polymer Handbook, 4$^{th}$ Edition, J. Brandrup, ISBN-10: 0471479365; ISBN-13: 978-0471479369.

A suitable solvent may be a solvent having a total Hansen solubility parameter in the range of 16.6 MPa$^{1/2}$ to 25 MPa$^{1/2}$, in particular 17 MPa$^{1/2}$ to 25 MPa$^{1/2}$, in particular 17.1 MPa$^{1/2}$ to 25 MPa$^{1/2}$, in particular in the range of 17.2 MPa$^{1/2}$ to 24.9 MPa$^{1/2}$, in particular in the range of 17.4 MPa$^{1/2}$ to 24.8 MPa$^{1/2}$.

Owing to the uniformity of the particles and their spherical shape, they have a relatively high knock density. This can be expressed as Hausner ratio. The Hausner ratio is the ratio of the freely settled bulk density of a powder to the tapped bulk density of the powder. The Hausner ratio is correlated to the flowability of a powder. The Hausner ratio is not an absolute property of a material. Its value can vary depending on the methodology used to determine it. For the purpose of the present invention the Hausner ratio is determined by use of a commercially available tapping device SVM10, purchased from ERWEKA GmbH, Heusenstamm, Germany at 100 strokes having an amplitude of 2 mm and a stroke frequency of 4 Hz.

The Hausner ratio of the particles can be between 1.00 and 1.25, in particular between 1.00 and 1.15, in particular between 1.00 and 1.10.

50% of the particles may have a volume equivalent spherical diameter (=VESD) that is smaller than or equal to 10 µm to 150 µm, in particular smaller than or equal to 30 µm to 90 µm, in particular smaller than or equal to 35 µm to 90 µm, in particular smaller than or equal to 40 µm to 90 µm, in particular smaller than or equal to 45 µm to 90 µm.

A measure for the width of the particle size distribution is the span. The span is defined as the ratio of the difference between the VESD where 90% of the particle population lies below (=$x_{90.3}$) and the VESD where 10% of the particle population lies below (=$x_{10.3}$) to the VESD where 50% of the particle population lies below (=$x_{50.3}$), i. e. the span is (($x_{90.3}$−$x_{10.3}$)/$x_{50.3}$).

The span of the particles may be in the range of 1.0 to 1.75, in particular in the range of 1.0 to 1.5, in particular in the range of 1.0 to 1.35, in particular in the range of 1.0 to 1.25.

In an embodiment the solvent and the solid polymer immersed in the solvent are heated in step a) to a temperature below 174° C., i. e. the first temperature is a temperature below the melting point of PVDF. The melting point of PVDF is about 175° C. The solvent in which the polymer is dissolved in step a) may be diethylene glycol monobutyl ether acetate. The inventors found that the selection of the solvent influences sphericity of the resulting particles and particle size distribution of the resulting population of particles. The afore-mentioned solvent results in particular spherical particles in a population of particles having a narrow range of particle sizes.

Furthermore, the inventors recognized that diethylene glycol monobutyl ether acetate dissolves the polymer at a relatively low temperature far below the melting point of the polymer. This solution temperature is the first temperature according to claim 1. It depends on the solvent and on the concentration of the polymer in the solvent. For diethylene glycol monobutyl ether acetate it is in the range of 126° C. to 135° C.

It is possible to add at least one additive to the solution during step a) or step b) before the polymer particles are formed, i. e. before the second temperature is reached or to the solvent in step a). The additive may be an additive for supporting nucleation or an additive supporting flow of the final particles. In both cases this additive may be pyrogenic silica, in particular hydrophobic pyrogenic silica, pyrogenic metal oxide or carbon black. The carbon black may be PRINTEX® U Powder purchased from The Cary Company, Addison, IL 60101, USA. The pyrogenic metal oxides may be Aeroxide® Alu C, Aeroxide® Alu 65, Aeroxide® Alu 130, Aeroxide® Alu C 805; Aeroxide® TiO2 P25, Aeroxide® TiO2 P90, Aeroxide® TiO2 T 805 and Aeroxide® TiO2 NKT 90 purchased from Evonik Resource Efficiency GmbH, Rodenbacher Chaussee 4, 63457 Hanau-Wolfgang, Germany. The hydrophobic pyrogenic silica may be Aerosil® R 106 or Aerosil® R 812 purchased from Evonik Resource Efficiency GmbH, Hanau-Wolfgang, Germany or hydrophobic HDK® pyrogenic silica purchased from Wacker Chemie AG, Munich, Germany, such as HDK® 20 or HDK® 30.

Furthermore, the additive may be an additive for stabilizing the formed polymer rich droplets, such as a polysorbate, in particular polysorbate 85. Polysorbate 85 is distributed under the commercial name Tween® 85, e. g. by Merck KGaA, Darmstadt, Germany.

Each of the additives may be added in a concentration range of 0.01 wt. % to 3 wt. %, in particular 0.05 wt. % to 2 wt. %, in particular 0.1 wt. % to 1 wt. %. The effect of these additives is that the generation of very fine particles is prevented and that the flowing features of the population of particles is improved. Furthermore, porosity of the resulting particles can be reduced and sphericity of the resulting particles can be increased by the additives, in particular by the polysorbate. Instead or in addition to the mentioned additives it is also possible to add a pigment, e. g. titanium dioxide or soot as pigment for supporting laser energy absorption, and/or any other additive providing a specific function, such as a thermal stabilization, an antistatic effect or a flame retarding effect. The additive may also be an additive for stabilization of the particles such as an antioxidant. The antioxidant protects the particles against thermo-oxidative degradation. It can be a primary antioxidant, in particular a secondary aromatic amine or a phenolic antioxidant, in particular a sterically hindered primary phenolic antioxidant, in particular pentaerythritol tetrakis(3-(3,5-di-tert-butyl-4-hydroxyphenyl)propionate) that can be purchased from BASF Corporation under the tradename Irganox® 1010. The antioxidant can also be a secondary antioxidant together with a primary antioxidant. The secondary antioxidant can be a thioether, an organic sulfide or an organo-phosphite such as tris[2-[[2,4,8,10-tetra-tert-butyldibenzo[d,f][1,3,2]dioxaphosphepin-6-yl]oxy]ethyl] amine that can be purchased from BASF Corporation under the tradename Irgafos® 12. An additive having an antistatic effect may be an alkyl sulphonate. An additive having a flame retarding effect may be aluminum diethyl phosphinate (AlPi) in combination with melamine polyphosphate (MPP).

The particles separated from the solution or gel in step c) may be washed and/or dried and/or desagglomerated. Drying may be performed, e. g., in a vacuum drying oven at a pressure of about 600 mbar and 45° C. for about 24 hours. A desagglomeration may be achieved by agitation during or after drying. For example, desagglomeration can be achieved by agitating agglomerated particles in a sieve until all particles passed the sieve, in particular a sieve having a mesh of the maximal particle size, e. g. a 200 µm mesh. Since no residual particles remain in the sieve, the sieving is not a selection process.

The invention further concerns a population of particles produced according to the method of the invention. The population of particles differs from known populations of particles by the relatively spherical form of the particles and the very narrow range of particle size distribution in the population, in particular if no selection process is applied to the population of particles.

The invention further concerns the use of the population of particles produced according to the method of the invention as an additive in the production of lacquer or for additive manufacturing, such as selective laser sintering (=SLS) or selective laser melting (=SLM), a powder bed fusion processes or laser beam melting of a polymer. The lacquer may be part of a coating system to be applied in two or more layers.

Figure 2A:
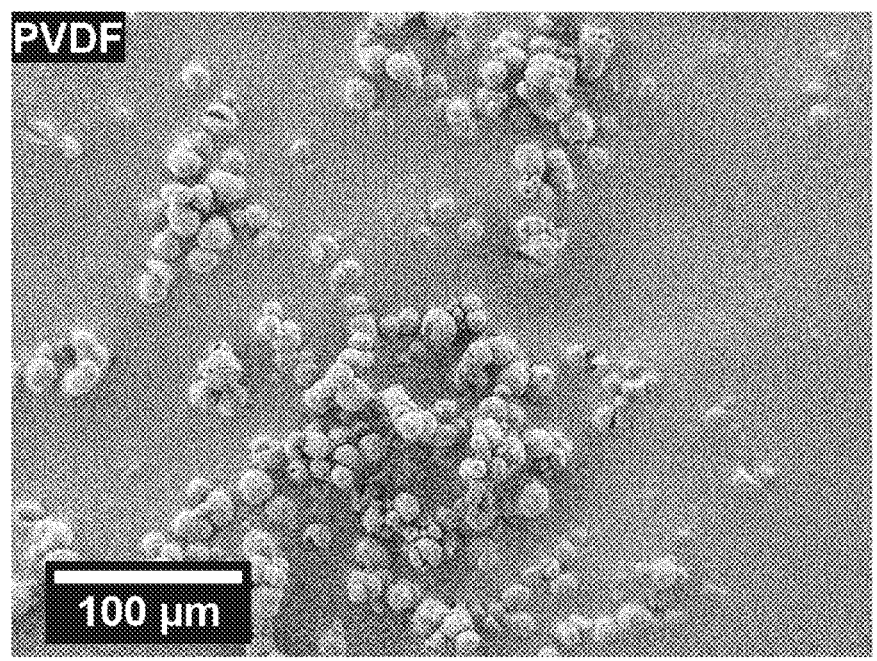
Figure 2B:
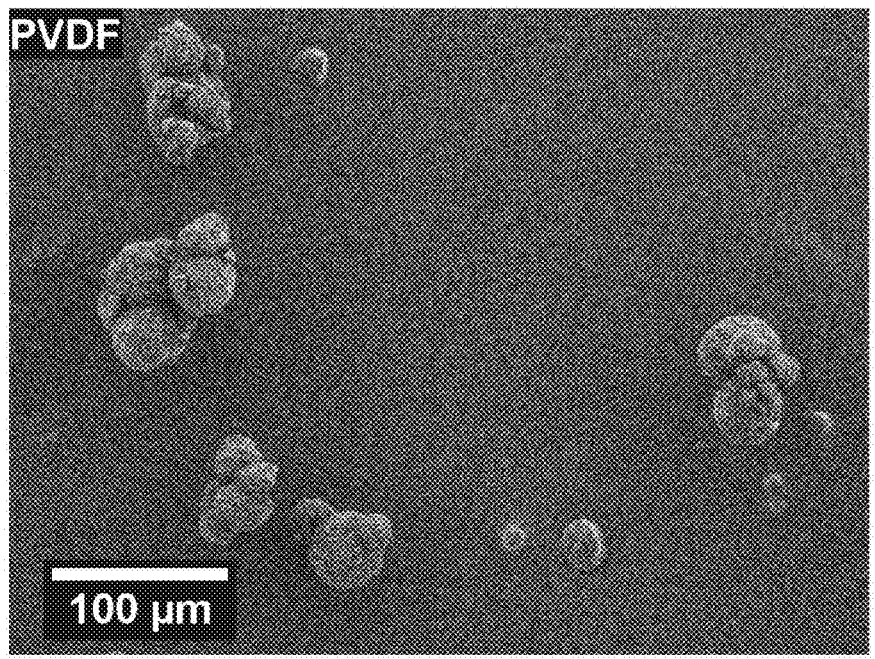
Figure 2C:
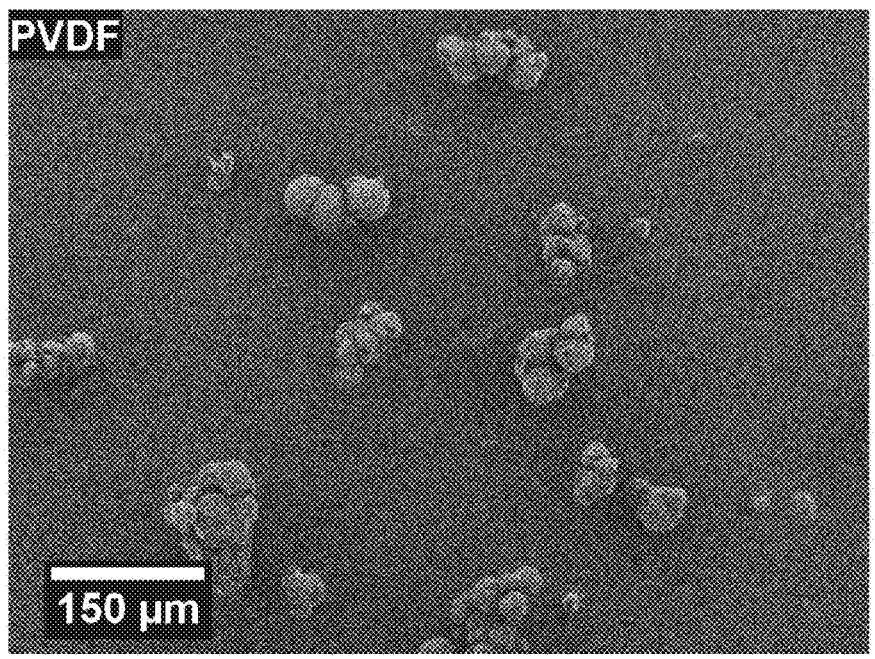
Figure 3:
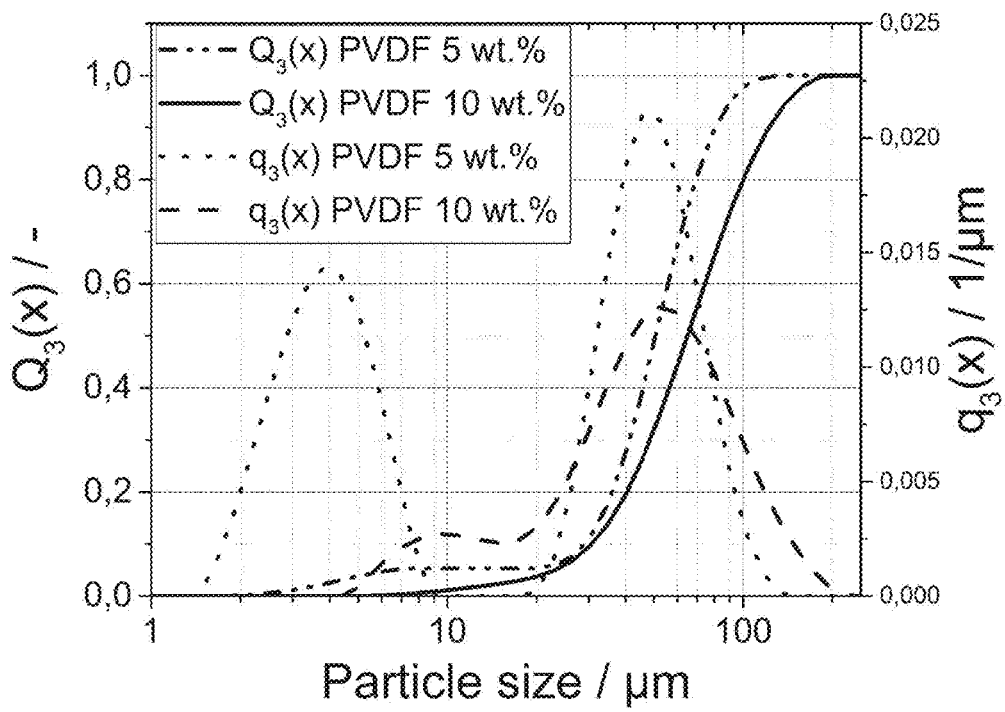
Figure 4:
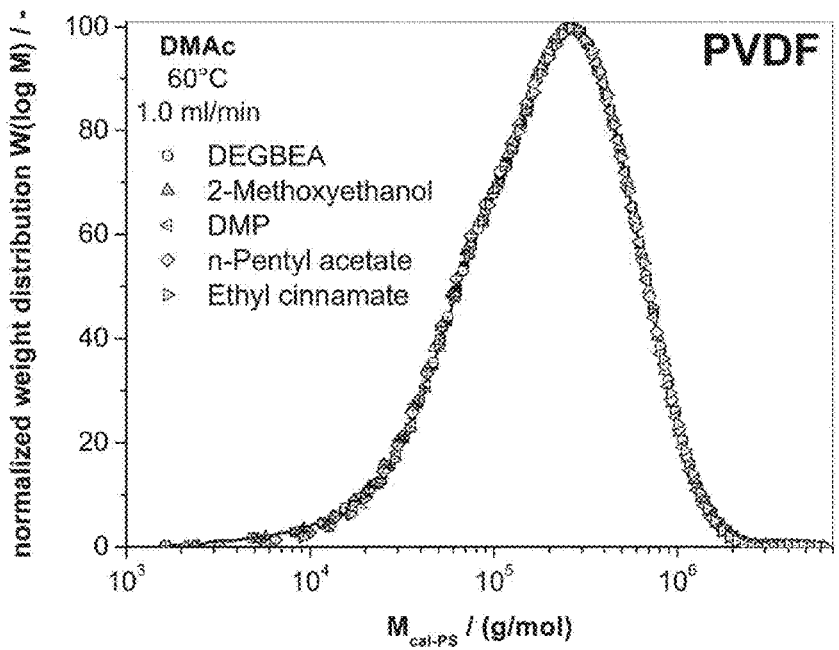

In the following the invention is described by means of examples:

FIG. 1 shows the first temperature (=solution temperature) and third temperature (=begin turbidity) for PVDF dissolved in diethylene glycol monobutyl ether acetate at different concentrations, FIGS. 2a to 2c show scanning electron microscope (=SEM) photographs of PVDF particles precipitated from solutions of PVDF having different PVDF concentrations in diethylene glycol monobutyl ether acetate, FIG. 3 shows particle size distributions of populations of PVDF particles precipitated from solutions of PVDF having different PVDF concentrations in diethylene glycol monobutyl ether acetate, FIG. 4 shows results of gel permeation chromatography measurements of dissolved PVDF particle samples, FIG. 5 shows in a table particles obtained with different suitable solvents in a method according to the invention and with methyl glycol and FIG. 6 shows in a table solvents which were not suitable for producing relatively spherical particles.

GENERAL EXPERIMENTAL PROCEDURE FOR PRODUCING A POPULATION OF PARTICLES OF A POLYMER

Preparations having a total weight of 40 g or 100 g were heated and stirred in an autoclave. Temperature was continuously measured by use of a thermal element. Furthermore, turbidity was constantly measured by use of a photometer. Turbidity can also be determined visually. After achieving the first temperature this temperature was maintained for 15 min. Then stirring and heating was stopped. Afterwards, the solution was cooled down, wherein temperature and turbidity were constantly measured and cooling down was controlled. After the solution achieved a temperature of about 50° C. the autoclave was opened and the particles formed in the solution or gel were separated from the solution by use of a suction filter and in case a gel had formed from the gel by washing out the particles from the gel and then passing the washing fluid through a suction filter. The particles on the filter were washed by use of ethanol. Then the particles were dried in a vacuum oven at about 600 mbar and 45° C. for about 24 hours. The resulting powder was sieved by use of a 200 µm mesh sieve for achieving a desagglomeration of the particles. Alternatively, the formation of agglomerates could have been prevented by agitating the particles during drying.

In case of the addition of at least one additive the additive was added to the solvent before dissolving the polymer.

Specific Example

PVDF slices were produced by sawing slices from a PVDF bar having a diameter of 1 cm which bar was purchased from Erwin Telle GmbH, Sigmundstraße 176, 90431 Nuremberg, Germany. In a first example 2 g of these PVDF slices were given in an autoclave together with 38 g of diethylene glycol monobutyl ether acetate. In a second example 4 g of the PVDF slices were given in an autoclave together with 36 g of diethylene glycol monobutyl ether acetate. Therefore, the PVDF contents in the preparations were 5 wt. % in the first and 10 wt. % in the second example. In both examples the autoclave was closed and the preparation was stirred at 500 rpm. The preparation was heated to 200° C. 200° C. were maintained for 15 min to 30 min for allowing a complete dissolving of the PVDF in the diethylene glycol monobutyl ether acetate. Then heating and stirring were stopped and the solution was allowed to cool down at a rate of 0.8° C./min to about 50° C. Turbidity was measured in a separate procedure in which the PVDF was dissolved in the same solvent at the same concentration. FIG. 1 shows for solutions having different concentrations of PVDF the solution temperatures, i. e. the temperatures at which turbidity of the solutions disappeared as a result of a complete solving of the polymer in the solvent when heating the solutions. FIG. 1 further shows the temperatures at which turbidity of the solutions began, i. e. the third temperatures, for these solutions. For a solution having a concentration of 5 wt. % PVDF the third temperature was about 106° C. FIG. 1 shows that the first temperature and third temperature depend on the polymer concentration.

After a temperature of about 50° C. was reached the autoclave was opened and the formed particles were separated from the solution by suction separation using a suction filter in the form of a Büchner funnel comprising a paper filter. The particles on the paper filter were washed with ethanol. Afterwards the particles were dried in a vacuum drying oven at a pressure of about 600 mbar and 45° C. for about 24 hours. Since no agitation occurred during drying, agglomerates formed during the process were not destroyed. For desagglomeration the agglomerated particles were agitated in a 200 μm mesh sieve until no residues remained on the sieve.

A scanning microscope (=SEM) photograph of the particles resulting from the first example is shown in FIG. 2a and SEM photographs of the particles resulting from the second example are shown in FIGS. 2b and 2c. From FIGS. 2a to 2c it can be seen that the particles are relatively spherical.

Resulting particle size distributions are shown in FIG. 3. The meanings of $Q_3(x)$ and $q_3(x)$ are as follows:

$Q_3(x)$: Volume cumulative distribution of the particle size x, wherein the particle size is defined as volume equivalent spherical diameter (VESD) normalized to the value 1 for the cumulative volume of all particles. If $Q_3(x)$ is 0.5 half of all of the particles have a volume that is equal or smaller than that of the particles having the VESD corresponding to that value. This diameter is designated as $x_{50.3}$ or mean diameter. VESD has been determined by laser diffraction using the Mastersizer 2000 purchased from Malvern Panalytical GmbH, Kassel, Germany. VESD has been determined from wet suspension in case of the particles obtained from the 5 wt. % solution and from the dried particles in case of the particles obtained from the 10 wt. % solution.

$q_3(x)$: Frequency distribution indicating frequency of particles having a specific VESD.

FIG. 3 shows $Q_3(x)$ and $q_3(x)$ values for 5 wt. % and 10 wt. % polymer concentration. The mean VESD of particles obtained from the 5 wt. % PVDF containing solution was about 37 μm and the span $((x_{90.3}-x_{10.3})/x_{50.3})$ was about 1.2. The mean VESD of particles obtained from the 10 wt. % PVDF containing solution was about 65 μm and the span $((x_{90.3}-x_{10.3})/x_{50.3})$ was about 1.4.

In order to measure the molar mass distribution, samples of PVDF particles precipitated from di(ethylene glycol) monobutyl ether acetate (=DEGBEA), methyl glycol (=2-methoxyethanol), dimethyl phthalate (=DMP), n-pentyl acetate and ethyl cinnamate have been dissolved in dimethylacetamide (=DMAc) at 60° C. The resulting solutions were analyzed using triple detection Gel permeation chromatography (GPC) (Viscotek TDA 305, Malvern Panalytical Ltd, United Kingdom) with a mixture of DMAc and lithium bromide as eluent and refractive index, viscometer and light scattering detector. The measurements were calibrated with different polystyrene standards having defined molecular weights. Therefore, the measured molecular weights of PVDF are given in terms of the equivalent polystyrene molecular weights. FIG. 4 shows the results of these GPC measurements depicting the normalized polystyrene-calibrated molar weight distribution densities of the PVDF particle samples as a function of polystyrene-calibrated molar weights of the PVDF particle samples. The measurements show that the tested solvents do not influence molecular weight of PVDF in the particles, i.e. none of the solvents results in a degradation of PVDF.

FIG. 5 shows in a table solvents and details of these solvents that have been tested successfully including methyl glycol that is known from the art for producing PVDF particles. All tests the results of which are shown in FIGS. 4 and 5 were performed by giving 4 g of PVDF slices in an autoclave together with 36 g of the given solvent followed by stirring and heating to 200° C. 200° C. were maintained for 15 min to 30 min. Then heating and stirring were stopped and the solution or solvent with undissolved PVDF was allowed to cool down at a rate of 0.8° C./min to about 50° C. After a temperature of about 50° C. was reached the autoclave was opened and the formed particles or undissolved PVDF pieces were separated from the solution as described above.

The table according to FIG. 5 contains the elemental formula, values for $\delta_D$, $\delta_P$ and $\delta_H$ and the resulting total Hansen solubility parameter $\delta_T$, the structural formula and for most solvents electron microscopical pictures of particles obtained by the method according to the invention with the respective solvent. Though all of these solvents result in relatively spherical particles the pictures show that the forms and surfaces of the particles deviate from each other as a function of the solvent.

FIG. 6 shows in a table solvents and details of these solvents that have been tested in the method according to the invention. These solvents were not able to solubilize PVDF or resulted in flat but not spherical particles. Comparing the structural formulas of the solvents in FIG. 6 with the structural formulas of the solvents in FIG. 5 makes clear that more than one carbocyclic aromatic residue, a non-aromatic cyclic ketone, absence of a carboxylic acid ester group, a carbonyl group or an ether group and absence of more ether groups than hydroxyl groups in case a hydroxyl group is present in the molecule of the solvent prevents usability of the solvent for the method according to the invention.

The invention claimed is:

1. A method for producing a population of particles of a polymer, wherein the polymer is polyvinylidene difluoride (=PVDF) or a copolymer comprising polyvinylidene difluoride, wherein the polymer is dissolved in an organic solvent, wherein molecules of the organic solvent comprise or consist of 3 to 22 carbon atoms, one or more oxygen atom(s) as heteroatom(s) and at most one carbocyclic or heterocyclic residue comprising carbon atoms which carbocyclic or heterocyclic residue is an aromatic residue, wherein the carbon atoms in the carbocyclic or heterocyclic residue are carbon atoms taken from said 3 to 22 carbon atoms, wherein the one or more oxygen atom(s) is/are part of at least one carboxylic acid ester group or carbonyl group, wherein the carbon atom in the carboxylic acid ester group and the carbonyl group is one of said 3 to 22 carbon atoms or/and at least one ether group and at most three hydroxyl groups, wherein in case of presence of at least one hydroxyl group the number of ether groups always exceeds the number of hydroxyl groups, wherein in case of presence of only 3 carbon atoms the molecule comprises additionally at least one pseudohalogen or additionally at least one further heteroatom selected from halogen, N, B, P and S, wherein the method comprises the following steps:

a) heating the organic solvent and the solid polymer immersed in the organic solvent at least until the polymer completely dissolves forming a solution, b) cooling the solution until polymer particles are formed, and c) separating the particles formed during step b) from the solution or from a gel formed from the solution during step b), wherein at least 96% of the particles in the population of particles have a particle size in the range of 5 μm to 200 μm.

2. The method according to claim 1, wherein the weight of the polymer in relation to the total weight of the organic solvent and the polymer is in the range of 0.01 wt. % to 50 wt. %.

3. The method according to claim 1, wherein cooling is performed until clouding of the solution starts, wherein cooling is continued at least until turbidity does not further increase, wherein cooling is continued after onset of clouding at a rate in a range of 0.05° C./min to 5° C./min or cooling of the solution is stopped at the onset of clouding for at least 5 min and then the solution is cooled at a rate in a range of 0.05° C./min to 5° C./min or cooling of the solution is continued for up to 3° C. after the onset of clouding and then stopped for at least 5 min and then the solution is cooled at a rate in a range of 0.05° C./min to 5° C./min.

4. The method according to claim 3, wherein cooling in step b) is interrupted for at least 5 min 12° C. to 0.01° C. above a temperature at which clouding starts which temperature is determined before in a separate procedure.

5. The method according to claim 4, wherein interruption of cooling is maintained for a time in the range of 5 min to 150 min.

6. The method according to claim 1, wherein the organic solvent and/or the solution are/is agitated during steps a) and b).

7. The method according to claim 6, wherein the solution is agitated during step b) such that a laminar flow forms in the predominant part of the solution which laminar flow is maintained at least during the predominant time of performance of step b).

8. The method according to claim 1, wherein the organic solvent has a total Hansen solubility parameter in the range of 16.6 MPa$^{1/2}$ to 25 MPa$^{1/2}$.

9. The method according to claim 1, wherein Hausner ratio of the particles is between 1.00 and 1.25 and/or wherein 50% of the particles have a volume equivalent spherical diameter (=VESD) that is smaller than or equal to 10 µm to 150 µm and/or a span of the particles is in the range of 1.0 to 1.75, wherein the span is defined as the ratio of the difference between the VESD where 90% of the particle population lies below (=$x_{90.3}$) and the VESD where 10% of the particle population lies below (=$x_{10.3}$) to the VESD where 50% of the particle population lies below (=$x_{50.3}$).

10. The method according to claim 1, wherein the organic solvent and the solid polymer immersed in the organic solvent are heated in step a) to a temperature below 174° C.

11. The method according to claim 1, wherein the molecules of the organic solvent comprise at least one additional heteroatom selected from halogen, O, N, B, P and S or comprises at least one pseudohalogen or further pseudohalogen.

12. The method according to claim 1, wherein the molecules of the organic solvent comprise at least one pseudohalogen or further pseudohalogen selected from —CN, —N$_3$, —OCN, —NCO, —CNO, —SCN, —NCS, —SeCN.

13. The method according to claim 1, wherein the further heteroatom and the additional heteroatom are selected from N, B, P and S.

14. The method according to claim 1, wherein the organic solvent is at least one organic solvent selected from the group consisting of diethylene glycol monobutyl ether acetate, acetyltributylcitrate, acetophenone, benzaldehyde, diethylene glycol monoethyl ether, dimethyl phthalate, isoamyl acetate, ethylene glycol n-butyl ether acetate, isobutyl acetate, ethyl benzoate, ethyl cinnamate, n-hexyl acetate, propylene glycol monomethyl ether acetate, pentyl acetate, triacetin, n-butyl acetate, or propyl acetate.

15. The method according to claim 1, wherein at least one of pyrogenic silica, pyrogenic metal oxide or carbon black and/or a pigment, an antistatic agent, a flame retarding agent, a thermally stabilizing agent, an antioxidant and/or a polysorbate is added to the organic solvent in step a) or to the solution during step a) or step b) before the polymer particles are formed.

16. The method according to claim 1, wherein the particles separated from the solution or the gel in step c) are washed and/or dried and/or desagglomerated.

17. A population of particles produced according to the method of claim 1.

18. A method, comprising using the population of particles produced according to the method of claim 1 for additive manufacturing.

19. The method according to claim 18, wherein said additive manufacturing method is selected from the group consisting of selective laser sintering (=SLS), selective laser melting (=SLM), a powder bed fusion processes or laser beam melting of a polymer or as an additive in the production of lacquer.

* * * * *